United States Patent Office 3,392,257
Patented July 9, 1968

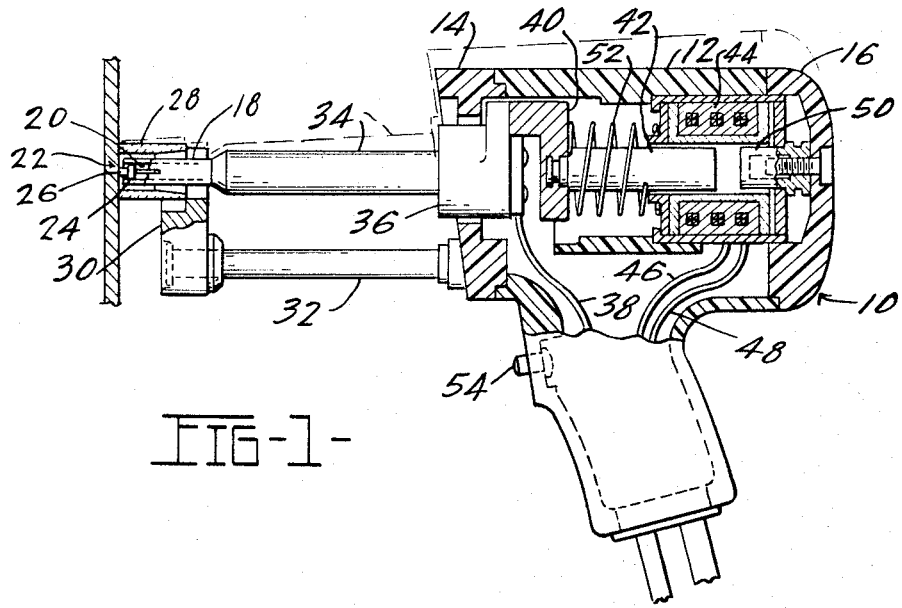
FIG-1-
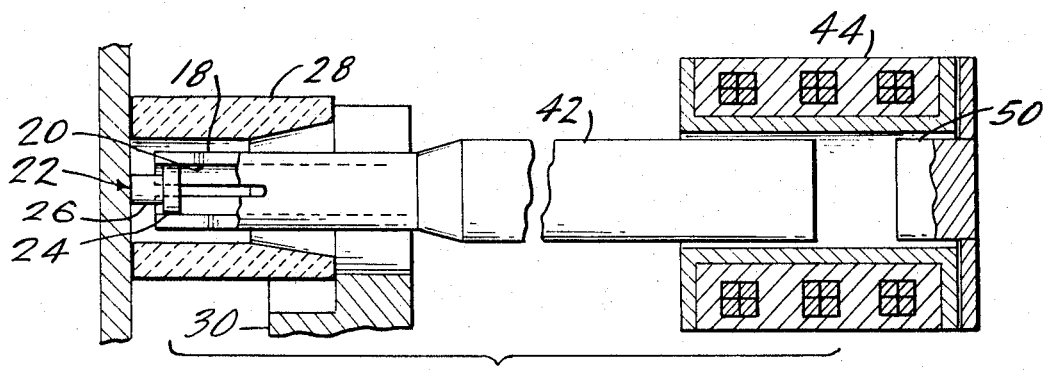
FIG-3-
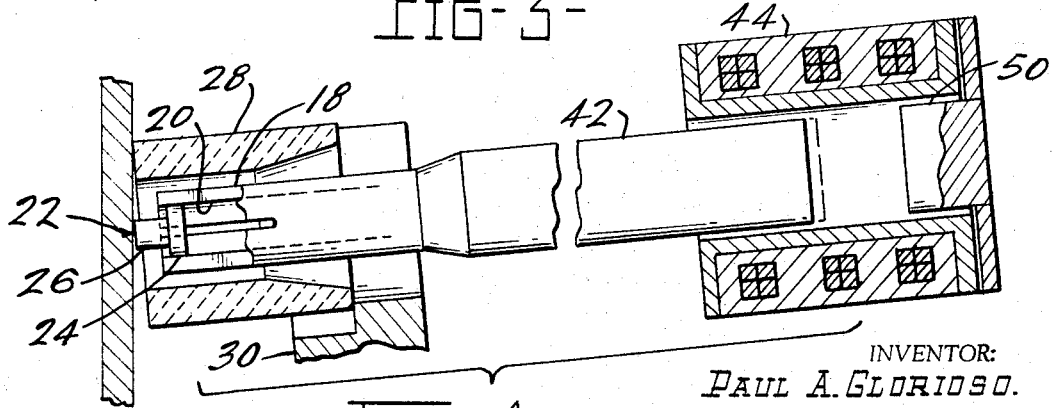
FIG-4-
INVENTOR:
PAUL A. GLORIOSO.
BY
ATT'YS.

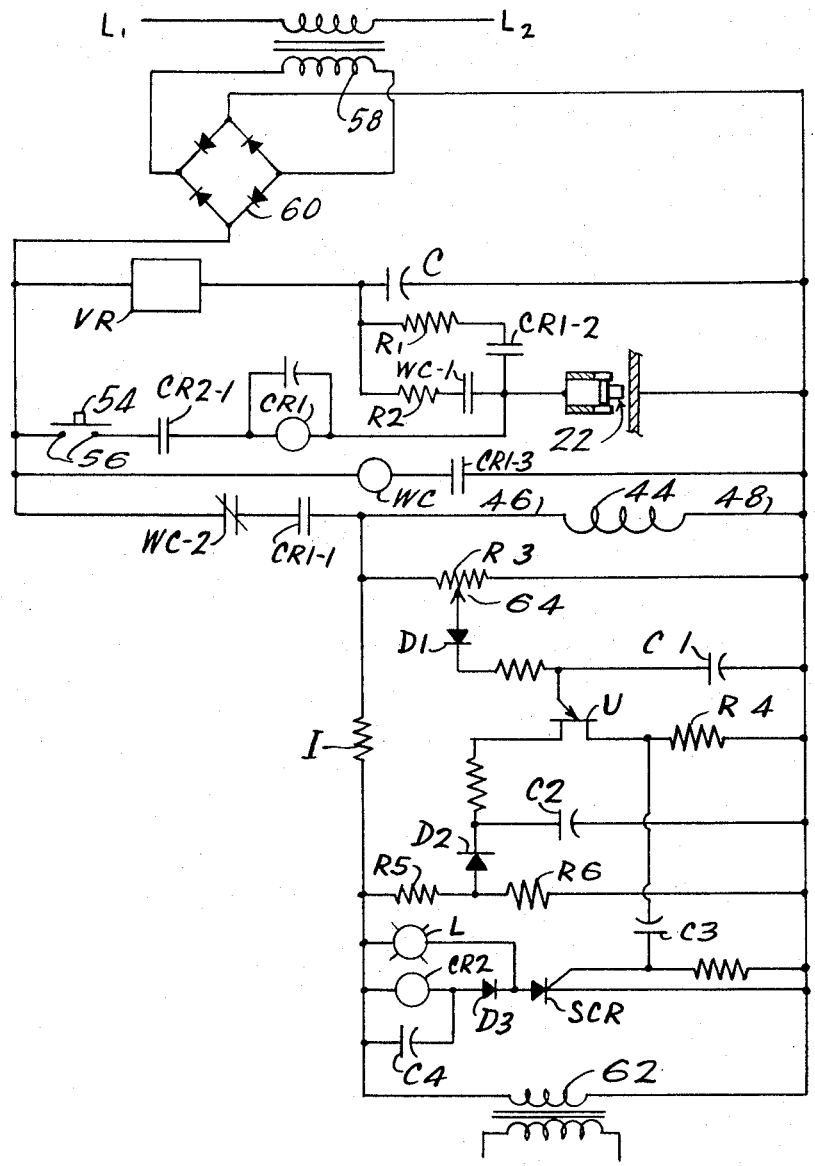
FIG-2-

3,392,257
WELDING APPARATUS WITH MEANS FOR SENSING POSITION OF WELDABLE FASTENER
Paul A. Glorioso, Amherst, Ohio, assignor to Gregory Industries, Inc., Lorain, Ohio, a corporation of Michigan
Filed Dec. 29, 1965, Ser. No. 517,293
13 Claims. (Cl. 219—98)

This invention relates to welding apparatus having means for sensing the position of a fastener to be welded and for preventing the welding of the fastener if it is not in a predetermined position.

Welding apparatus with sensing means according to the invention is particularly useful where the positions of fasteners being welded to a surface of a workpiece must be maintained within close limits. By way of illustration, small weldable fasteners or studs are often used to secure decorative trim molding to the body of an automobile. Suitable templates can be used to position the studs along a predetermined line or path. However, the templates do not prevent the studs from being tilted relative to the surface of the automobile body. If a stut is at a sufficient angle, the head of the stud will be thrown out of alignment with the other studs and an intermediate clip used between the stud and the molding may not properly fit with the stud.

In end welding the stud to the workpiece, the welding tool usually retracts the stud a predetermined distance relative to the workpiece during the welding operation, about the time the main welding arc is struck between the stud and the workpiece. With this type of welding, if the stud is too short, or if there happens to be a depression at the point on the surface to which the stud is to be welded, the stud may be withdrawn an excessive distance from the surface of the workpiece with the result that either no welding arc or a weak welding arc will be established between the two. No weld or a weak weld thereby will result.

In accordance with the instant invention, position-sensing means are provided for a welding tool which senses the position of the stud to be welded prior to the beginning of the welding cycle. If the stud is not in a proper position, the welding circuit, by means of which the welding operation is effected, is rendered inoperative until the proper stud position is attained. This can be accomplished by moving the stud to the proper angle, by replacing the stud with one of the proper length, or by moving the stud to a different location on the workpiece. The position-sensing means according to the invention requires no additional components or wires in or on the welding tool and requires no additional mechanical or moving parts at all. Consequently, the weight of the welding tool itself is not increased nor is the maintenance for the welding tool or power source and control circuitry increased to any extent.

It is, therefore, a principal object of the invention to provide fastener position-sensing means for a welding tool which will prevent a welding cycle from being initiated if the fastener is not in a proper position relative to to the tool.

A further object of the invention is to provide fastener position-sensing means which does not require any additional components or wires for a welding tool with which it is used.

A still further object of the invention is to provide fastener position-sensing means which does not require any moving parts.

Numerous other objects and advantages of the invention will be apparent from the following detailed description of a preferred embodiment thereof, reference being made to the accompanying drawings, in which:

FIG. 1 is a view in longitudinal cross section of a typical welding tool with which the fastener position-sensing means according to the invention can be employed;

FIG. 2 is a diagrammatic view of a welding circuit and a fastener position-sensing circuit in accordance with the invention;

FIG. 3 is a schematic view of a fastener and components of a welding tool when in a position perpendicular to a workpiece; and FIG. 4 is a view similar to FIG. 3 but with the fastener and welding tool components at an angle to the workpiece.

Referring to FIG. 1, a stud welding tool embodying the invention is indicated at 10 and is of conventional design, requiring no additional special components to enable practice of the invention. The tool 10 includes a main housing 12 of dielectric material having a front wall 14 and a rear cap 16. A chuck 18 is located at the forward end of the tool and has a slotted recess 20 to receive a stud 22. As shown more particularly in FIGS. 3 and 4, the stud 22 has an enlarged head 24 and a stem or shank 26, the head 24 being engaged by the chuck 18 and the shank 26 protruding from the chuck toward a workpiece.

A spark shield 28 is located around the stud 22 and is positioned so that the end of the stud shank 26 protrudes slightly beyond the shield before the end of the stud is pressed against the surface of the workpiece. The spark shield 28 is supported and positioned by a supporting foot 30 which, in turn, is supported at the front of the tool by a pair of adjustable legs 32 mounted in the tool housing. Rather than a permanent spark shield, as shown, a disposable ferrule can be used for the same purpose, with the ferrule held in a similar position by a suitable supporting foot, as is well known in the art.

The stud chuck 18 is attached to a chuck leg 34 which is electrically connected by a cable clamp 36 to a main welding cable 38. A rear cable clamp part 40 is attached to the clamp 36 and, in turn, is connected to a movable solenoid core 42 so that the core 42 moves longitudinally of the tool along with the cable clamp parts 36 and 40, the leg 34, the chuck 18, and the stud 22. The core 42 extends into a lifting and holding coil 44 and is pulled or retracted into the coil when sufficient power is supplied through leads 46 and 48. An adjustable stop 50 at the rear of the coil 44 determines the extent to which the core moves into the coil and, hence, determines the extent to which the stud 22 is retracted from the workpiece during the welding cycle. A return or plunge spring 52 returns the stud to the workpiece after a main welding arc has been established between the stud and the workpiece for a predetermined time with the stud in the retracted position, and after the current to the coil 44 is shut off.

Reference is now made to the welding cycle part of the circuitry of FIG. 2. It is to be understood that the particular welding cycle portion of the circuit is for purpose of illustration only and that many suitable welding circuits can be used with the stud position-sensing portion of the circuit according to the invention. With the stud 22 pressed against the workpiece, at which time the end of the shank 26 is pushed rearwardly slightly until flush with the end of the spark shield 28, a trigger 54 of the tool is pressed to close contacts 56. Assuming that the stud is properly positioned, to be discussed later, a circuit is thereby completed from a suitable source of power represented by a transformer 58 and a full wave rectifier 60, to a first control relay CR1. When the relay CR1 is energized, first normally open contacts CR1–1 are closed to supply power to the lifting coil 44 and initiate retraction of the stud 22. At the same time, normally open contacts CR1-2 are closed to establish a pilot arc across the stud and the workpiece through a resistor R1, from a source of energy represented by a main capacitor C. Additionally, normally open contacts CR1-3 are closed to complete an electrical path for a main welding contactor WC.

The main welding contactor WC closes contacts WC-1 in the main welding circuit to connect the capacitor C with the stud and the workpiece through a coil or other impedance R2 and enable the capacitor C to discharge fully across the stud and the workpiece to establish the main welding arc following the onset of the previously established pilot arc. The stud 22 is in its retracted position by this time, spaced a predetermined distance from the workpiece by virtue of the adjustable stop 50 of the welding tool. The contactor WC moves relatively slowly so that the stud has had time to reach this position prior to the striking of the main welding arc. The welding contractor WC also opens normally closed contacts WC-2 to de-energize the lifting coil 44 and cause the stud to begin its plunge stroke under the closing force of the plunge spring 52. The contacts WC-1 and WC-2 are positioned to close in a manner such that the stud will contact the workpiece after the welding arc is extinguished but before the pools of metal melted by the main welding arc can solidify.

After the completion of the weld, the capacitor C again is charged to a predetermined voltage by suitable voltage regulation circuit means designated VR. The voltage regulation can be in accordance with that shown in my Patent 3,136,880. Various other voltage regulation devices also can be employed to control the charging of the capacitor C.

Before referring to the lower part of the circuit diagram of FIG. 2, which part represents the stud position-sensing portion of the circuit, attention is first drawn to FIGS. 3 and 4. In these figures, the chuck 18, the stud 22, the spark shield 28, the supporting foot 30, the chuck leg 34, the core 42, and the coil 44 are shown schematically. In FIG. 3, the welding tool and stud are positioned in a truly perpendicular position relative to the surface of the workpiece. In this position, the core 42 extends into the coil 44 a particular distance, as shown. In FIG. 4, the tool is tilted at an angle to the surface of the workpiece, in which instance, the tip of the stud shank 26 extends further from the tool and slightly beyond the spark shield 28. In this position, the core 42 extends into the coil 44 to a lesser extent than with the tool perpendicular as in FIG. 3, and the inductance of the coil is changed.

With a welding tool of the type shown, which retracts the stud to a predetermined position, regardless of its original position, if an attempt is made to weld a stud over a depression on the surface of the workpiece, an improper weld will result. In such an instance, the end of the stud shank will be too far from the surface when the stud is retracted and either a weak or no welding arc will persist. The sensing means according to the present invention, however, prevents such welds from occurring. If the stud is over a depression, it will protrude below the spark shield in the same manner as if the welding tool is tilted as shown in FIG. 4. Consequently, the inductance of the coil will be correspondingly lower and a weld will not be initiated.

The impedance, and specifically the inductance of the coil 44, changes according to the position of the core 42 therein. As the core moves further into the coil and the air gap between the core and the stop 50 decreases, the inductance of the coil increases. Generally, the change in inductance will be larger with a solid core and with a relatively large diameter core compared to the width of the air gap. The change in inductance will also be affected by the number of turns in the coil. In a preferred form, the core 42 will be stopped in the coil 44 prior to reaching the resonant point, and the inductance of the coil will increase generally proportionally to the core position as the core moves toward its maximum position into the coil, and decrease generally proportionally as the core moves out of the coil.

Referring now more particularly to the stud position-sensing portion of FIG. 2, a separate source of power 62, preferably low voltage alternating current, provides an exciting voltage for the coil 44, the power source being represented by transformer 58. This power is insufficient to cause the coil to retract the core. Rather than using the coil 44 both for lifting the stud and for indicating the position of the core, a second coil could be used around the coil 44 with the power source 62 connected with the second coil. This, however, involves additional cost and requires at least one additional lead for the welding tool 10.

An impedance designated I is in series with the coil 44, with the impedance being in the form of a resistor, a coil, or a capacitor but shown as a resistor. With the coil 44 and the impedance I in series, a change in the inductance of the coil 44 produces a change in current flow through and voltage drop across both the coil 44 and the impedance. The electrical signal produced as a result of the position of the core in the coil can then be used, in effect, to sense the position of the stud. If the stud protrudes beyond the spark shield excessively, as a result of an angular position of the tool or a depression in the workpiece, for example, or if the shank of the stud is too short, the impedance of the coil and the resulting electrical signal will not equal a predetermined value. In such an instance, the welding cycle will be prevented from operating. On the other hand, when the stud is in the proper position with the core further in the coil to a position such that the electrical signal does equal a predetermined value, then the welding cycle can be initiated upon the pressing of the trigger 54, or automatically when the stud is in the proper position.

Many means can be employed to place the welding cycle circuitry in operation when the electrical signal equals a predetermined value. In the specific arrangement shown, a resistor R3 is connected in parallel across the coil 44 and has an externally-adjustable voltage-divider tap designated 64 which can be adjusted to vary the sensitivity of the circuit or the extent of angular misalignment of the stud which will cause the welding circuit to be inoperative. When the inductance of the coil 44 is a predetermined value and the voltage appearing at the top 64 is a sufficient value, a unijunction transistor U is keyed to cause a silicon controlled rectifier SCR to conduct and thereby energize a control relay CR2 which closes contacts CR2-1 in series with the trigger contacts 56, thereby readying the welding cycle for operation when the trigger is pressed. If the inductance of the coil is below the predetermined value and the voltage at the tap 64 is insufficient, with the core extending into the coil less than a desired amount, the rectifier SCR will remain non-conducting and the relay CR2 will remain de-energized.

Referring now to the details of the specific circuit, a diode D1 connected with the tap 64 provides direct current to charge a capacitor C1 which causes the unijunction transistor U to conduct when the charge is sufficient, with the capacitor C1 when discharging through a resistance load R4. Resistors R5 and R6 provide reference voltage for the unijunction transistor. A diode D2 rectifies the reference voltage and a capacitor C2 tends to remove some of the ripple or smooth the DC current of the diode D2. Some ripple on the base of the unijunction transistor U is desirable, however, to increase the reliability of the circuit and enable the unijunction transistor to be keyed, as is known in the art.

A capacitor C3 couples the pulse from the unijunction transistor U to cause the SCR to turn on and at the same time prevents excessively high current to the rectifier SCR and prevents leakage thereto from the unijunction transistor. A capacitor C4 across the relay CR2 holds in the relay for a half cycle while a diode D3 prevents the capacitor C4 from discharging to an indicator lamp designated L which turns on when the relay CR2 is energized to show that the welding circuit is in operative condition. Without the capacitors C4, the relay CR2 would be de-energized after each half cycle when the voltage across the rectifier SCR and the gate voltage drop to zero.

Various modifications of the above described embodiment of the invention will be apparent to those skilled in the art, and it is to be understood that such modifications can be made without departing from the scope of the invention, if they are within the spirit and the tenor of the accompanying claims.

I claim:

1. In combination, a welding tool having a lifting coil, a stud chuck, and a core movable with said chuck and extending into said coil, electrical circuit means for supplying current to said coil to cause said core to be pulled into said coil and for supplying welding power to said chuck, sensing means for sensing an electrical signal responsive to the position of said core in said coil, and means responsive to said sensing means for rendering said electrical circuit means inoperative until said core extends into said coil a predetermined amount and for then rendering said electrical circuit means in operative condition.

2. The combination according to claim 1 characterized by manually-operated means for changing the position of the core in the coil at which said responsive means renders said electrical means operative.

3. The combination according to claim 1 wherein said electrical signal to which said sensing means is responsive is the current through said coil.

4. The combination according to claim 1 wherein said electrical signal to which said sensing means is responsive is the voltage across said coil.

5. In combination, a welding tool having a lifting coil, a stud chuck, and a core movable with said chuck and extending into said coil, electrical circuit means for supplying current to said coil and for supplying welding power to said chuck, additional circuit means including an additional power source, said additional circuit means having means for changing the impedance of said additional circuit means in response to the position of said core in said coil, said additional circuit means including means for rendering said electrical circuit means inoperative until impedance of said additional circuit means reaches a predetermined value.

6. The combination according to claim 5 characterized by manually-operated means for changing the impedance of said additional circuit means at which said electrical circuit means is rendered operative.

7. The combination according to claim 5 characterized by the impedance of said additional circuit means being in the form of inductance.

8. In combination with a welding tool having a lifting coil, a stud chuck, and a core movable with said chuck and extending into said coil, electrical circuit means for supplying power to said coil to pull in said core and for supplying welding power to said chuck, additional circuit means including a power source connected with said coil for supplying relatively low voltage to said coil, impedance means in said additional circuit means in series with said coil, and means in said additional circuit means for rendering said electrical circuit means operative when the inductance of said coil reaches a predetermined value.

9. The combination according to claim 8 characterized by manually-operated means for selecting the inductance at which said last-named means renders said electrical circuit means operative.

10. The combination according to claim 8 characterized by said last-named means comprising a unijunction transistor and means operatively connecting said unijunction transistor with said coil to apply voltage to said unijunction transistor sufficient to key it when inductance of said coil reaches the predetermined value.

11. The combination according to claim 10 further characterized by said welding tool having a trigger and contacts for energizing said electrical circuit means when the trigger is pressed, and said last-named means includes switch means in series with the trigger contacts, and means for closing the switch means when said unijunction transistor is keyed.

12. The combination according to claim 11 characterized further by said closing means comprising a semiconductor controlled rectifier which conducts when said unijunction transistor is keyed.

13. The combination according to claim 8 characterized by said last-named means comprising a semiconductor controlled rectifier, and means operatively connecting said rectifier with said coil to apply voltage to said rectifier sufficient to render it conducting when inductance of said coil reaches the predetermined value.

References Cited

UNITED STATES PATENTS

| | | | |
|---|---|---|---|
| 3,052,793 | 9/1962 | Dash | 219—98 |
| 3,291,958 | 12/1966 | Glorioso | 219—98 |

RICHARD M. WOOD, *Primary Examiner.*

C. CHADD, *Assistant Examiner.*